(12) United States Patent
Marcheret et al.

(10) Patent No.: US 10,109,277 B2
(45) Date of Patent: Oct. 23, 2018

(54) METHODS AND APPARATUS FOR SPEECH RECOGNITION USING VISUAL INFORMATION

(71) Applicant: Nuance Communications, Inc., Burlington, MA (US)

(72) Inventors: Etienne Marcheret, White Plains, NY (US); Josef Vopicka, Prague (CZ); Vaibhava Goel, Chappaqua, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/696,803

(22) Filed: Apr. 27, 2015

(65) Prior Publication Data

US 2016/0314789 A1    Oct. 27, 2016

(51) Int. Cl.
  *G10L 15/25*    (2013.01)
  *G10L 15/20*    (2006.01)
  *G10L 21/0208*  (2013.01)

(52) U.S. Cl.
  CPC .............. G10L 15/25 (2013.01); G10L 15/20 (2013.01); *G10L 2021/02087* (2013.01)

(58) Field of Classification Search
  CPC .......... G10L 15/22; G10L 15/25; G10L 15/20; G10L 2021/02087
  USPC ....................................................... 704/221
  See application file for complete search history.

(56) References Cited

U.S. PATENT DOCUMENTS

| | | | |
|---|---|---|---|
| 6,134,524 A * | 10/2000 | Peters ................... | G10L 25/87 704/233 |
| 2004/0267521 A1* | 12/2004 | Cutler .................... | G10L 15/25 704/202 |
| 2005/0228673 A1* | 10/2005 | Nefian ................... | G10L 15/25 704/270 |
| 2011/0144991 A1* | 6/2011 | Fousek ............... | G10L 19/0212 704/243 |
| 2015/0255061 A1* | 9/2015 | Xue ....................... | G10L 15/075 704/232 |
| 2015/0317990 A1* | 11/2015 | Fousek ................. | G10L 19/26 704/500 |
| 2016/0140951 A1* | 5/2016 | Agiomyrgiannakis .................... G10L 13/02 | 704/260 |
| 2016/0140964 A1* | 5/2016 | Connell, II ........... | G10L 15/25 704/231 |

* cited by examiner

*Primary Examiner* — Bharatkumar S Shah
(74) *Attorney, Agent, or Firm* — Wolf, Greenfield & Sacks, P.C.

(57) ABSTRACT

Methods and apparatus for using visual information to facilitate a speech recognition process. The method comprises dividing received audio information into a plurality of audio frames, determining for each of the plurality of audio frames, whether the audio information in the audio frame comprises speech from the foreground speaker, wherein the determining is based, at least in part, on received visual information, and transmitting the audio frame to an automatic speech recognition (ASR) engine for speech recognition when it is determined that the audio frame comprises speech from the foreground speaker.

19 Claims, 6 Drawing Sheets

METHODS AND APPARATUS FOR SPEECH RECOGNITION USING VISUAL INFORMATION

BACKGROUND

Some electronic devices, such as smartphones, tablet computers, and televisions include or are configured to utilize speech recognition capabilities that enable users to access functionality of the device via speech input. Audio input including speech is processed by an automatic speech recognition (ASR) system, which converts the input audio to recognized text. The recognized text may be interpreted by, for example, a natural language understanding (NLU) engine, to perform one or more actions that control some aspect of the device. For example, an NLU result may be provided to a virtual agent or virtual assistant application executing on the device to assist a user in performing functions such as searching for content on a network (e.g., the Internet) and interfacing with other applications by interpreting the NLU result.

SUMMARY

Some embodiments are directed to an electronic device. The electronic device comprises an audio input interface configured to receive audio information, a visual input interface configured to receive visual information, and at least one processor. The at least one processor is programmed to divide the received audio information into a plurality of audio frames, determine for each of the plurality of audio frames whether the audio information in the audio frame comprises speech from the foreground speaker, wherein the determining is based, at least in part, on the received visual information, and transmit the audio frame to an automatic speech recognition (ASR) engine for speech recognition when it is determined that the audio frame comprises speech from the foreground speaker.

Other embodiments are directed to a method of using visual information to facilitate a speech recognition process. The method comprises receiving audio information, receiving the visual information, dividing the received audio information into a plurality of audio frames, determining for each of the plurality of audio frames whether the audio information in the audio frame comprises speech from the foreground speaker, wherein the determining is based, at least in part, on the received visual information, and transmitting the audio frame to an automatic speech recognition (ASR) engine for speech recognition when it is determined that the audio frame comprises speech from the foreground speaker.

Other embodiments are directed to a non-transitory computer-readable medium encoded with a plurality of instructions that, when executed by at least one processor perform a method. The method comprises dividing received audio information into a plurality of audio frames; determining for each of the plurality of audio frames whether the audio information in the audio frame comprises speech from a foreground speaker, wherein the determining is based, at least in part, on received visual information, and transmitting the audio frame to an automatic speech recognition (ASR) engine for speech recognition when it is determined that the audio frame comprises speech from the foreground speaker.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
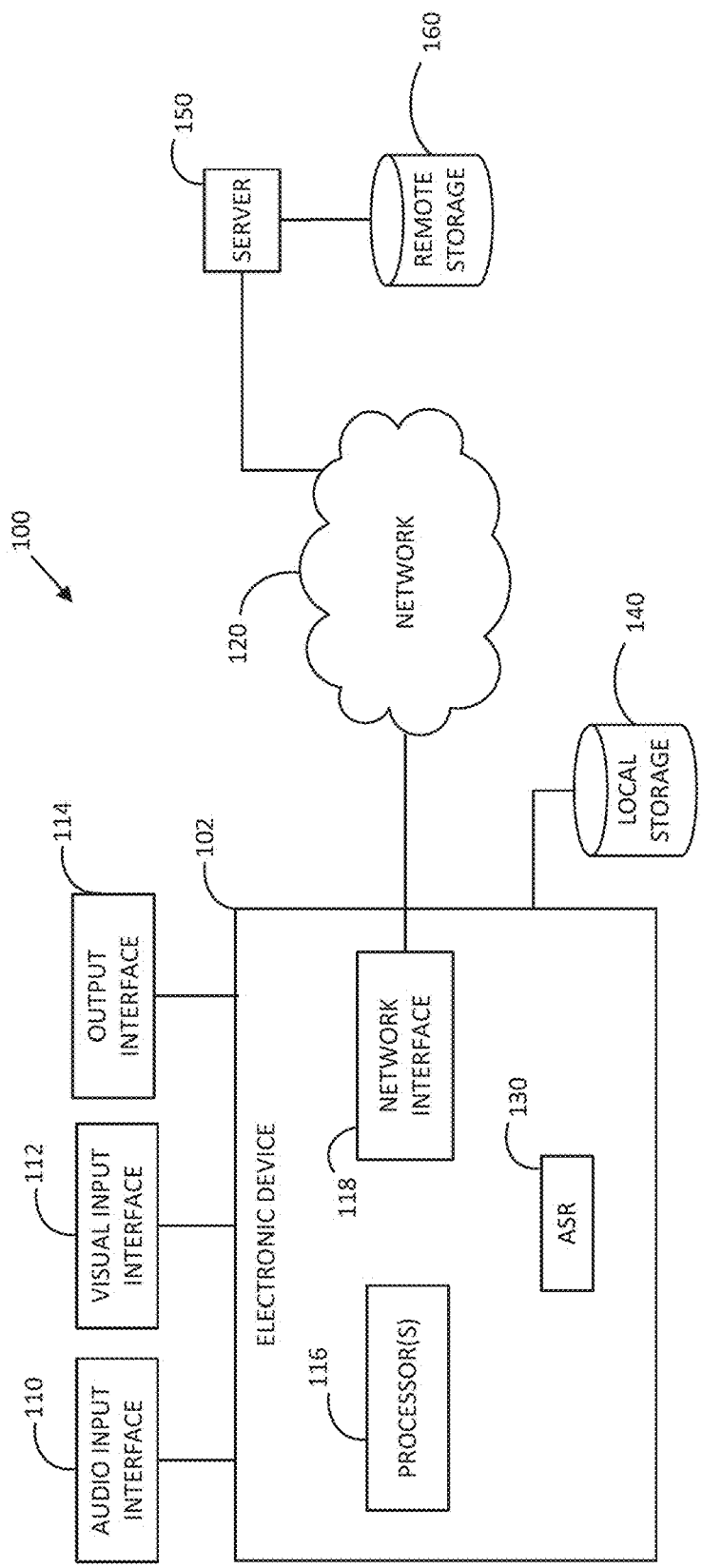
FIG. 1 is block diagram of a system in which an electronic device may be used in accordance with some embodiments.

Electronic devices with speech input capabilities are often used in environments in which audio received by the device (e.g., using a microphone) includes both speech input from a "foreground" user of the electronic device and other "background" audio signals, such as speech from other speakers near the electronic device and/or environmental noise. Separating speech from a foreground speaker from the background may be important for improving the ability of a speech recognition system to accurately recognize speech from the foreground speaker and/or to perform other tasks (e.g., speaker adaptation).

Some conventional ASR systems attempt to reduce the effect of background interference on the speech recognition process by analyzing the audio signal to identify which portions of the audio signal correspond to the foreground speaker and which portions of the audio signal correspond to background interference (e.g., background speakers, noise and/or other sources of background interference). In some conventional techniques, audio signals corresponding to the foreground speaker are emphasized and/or audio signals corresponding to background interference are suppressed. For example, automatic gain control techniques attempt to track the speech of the foreground speaker and adjust the gain of the speech accordingly, while suppressing the background interference. Beamforming techniques attempt to identify background interference during pauses in the speech of the foreground speaker and information about the background interference is used to enhance the speech of the foreground speaker relative to the background interference. A further class of solutions for addressing the challenge of separating foreground speech from background interference for ASR processing is to use speaker identification techniques that detect when a particular speaker begins speaking, such that the speaker's speech can be emphasized when detected.

The inventors have recognized and appreciated that existing techniques for distinguishing foreground speech from background interference in received audio for recognition by an ASR system may be improved by using visual information to augment the analysis of the received audio. For example, many devices, such as smartphones and tablet computers, include at least one imaging device (e.g., a camera) configured to capture still images and/or video. Some embodiments, discussed in more detail below, use visual information from captured images to identify segments of audio comprising speech from a foreground speaker. For example, a front-facing camera on a smartphone may be used to capture images of at least a portion of the foreground speaker (i.e., the user of the smartphone), and visual information determined from the captured images may be used to identify portions of the received audio that include speech input from the foreground speaker. Other examples of using visual information to facilitate ASR processing in accordance with the techniques described herein are discussed in further detail below.

FIG. 1 shows an illustrative computing environment 100 that may be used in accordance with some embodiments of the invention. Computing environment 100 includes electronic device 102. In some embodiments, electronic device 102 is a client device in a client-server architecture, as discussed in more detail below. In other embodiments, electronic device 102 is a standalone device that includes suitable processing and storage resources to implement the techniques described herein.

Electronic device 102 includes audio input interface 110 configured to receive audio input. For example, the audio input interface may include a microphone that, when activated, receives speech input, and the system may perform automatic speech recognition (ASR) based on the speech input either locally on the electronic device, remotely (e.g., on a server), or distributed between both. The received speech input may be stored in a datastore (e.g., local storage 140) associated with electronic device 102 to facilitate the ASR processing.

Electronic device 102 also includes visual input interface 112 configured to receive visual input. For example, the visual input interface may include at least one camera configured to capture one or more images comprising visual information. In some embodiments, electronic device 102 comprises a front-facing camera configured to capture an image of a foreground speaker and/or a rear-facing camera configured to capture an image of the environment around the electronic device. For example, the rear-facing camera may capture an image of one or more speakers other than the foreground speaker, and visual information determined from the image may be used to identify audio input corresponding to background interference using one or more of the techniques described herein.

In some embodiments, visual input interface 112 may be configured to receive visual information captured using an imaging device associated with, but not integrated with electronic device 102. For example, in some embodiments discussed in more detail below, a far-field camera may be configured to capture images of an environment in which the electronic device, such as a television, is located. Visual information captured by the far-field camera may be transferred to the electronic device (e.g., a remote control for a television) using any suitable communications medium (e.g., one or more wired or wireless networks). The electronic device may receive the visual information via visual input interface 112, and may use the received visual information to facilitate ASR processing using one or more of the techniques described herein.

Electronic device 102 also includes output interface 114 configured to output information from the electronic device. The output interface may take any form, as aspects of the invention are not limited in this respect. In some embodiments, output interface 114 may include multiple output interfaces each configured to provide one or more types of output. For example, output interface 114 may include one or more displays, one or more speakers, or any other suitable output device. Applications executing on electronic device 102 may be programmed to display a user interface to facilitate the performance of one or more actions associated with the application.

Electronic device 102 also includes one or more processors 116 programmed to execute a plurality of instructions to perform one or more functions on the electronic device. Exemplary functions include, but are not limited to, facilitating the storage of user input, launching and executing one or more applications on electronic device 102, and providing output information via output interface 114. Exemplary functions also include performing speech recognition (e.g., using ASR engine 130) and performing natural language understanding (NLU) processing, as discussed in more detail below.

Electronic device 102 also includes network interface 122 configured to enable the electronic device to communicate with one or more computers via network 120. Some embodiments may be implemented using a client/server system where at least a portion of an ASR and/or an NLU process is performed remotely from electronic device 102. In such embodiments, network interface 122 may be configured to provide information to one or more server devices 150 to perform ASR, an NLU process, both ASR and an NLU process, or some other suitable function. Server 150 may be associated with one or more non-transitory datastores (e.g., remote storage 160) that facilitate processing by the server.

Network 120 may be implemented in any suitable way using any suitable communication channel(s) enabling communication between the electronic device and the one or more computers. For example, network 120 may include, but is not limited to, a local area network, a wide area network, an Intranet, the Internet, wired and/or wireless networks, or any suitable combination of local and wide area networks. Additionally, network interface 122 may be configured to support any of the one or more types of networks that enable communication with the one or more computers.

In some embodiments, electronic device 102 is configured to process speech received via audio input interface 110, and to produce at least one speech recognition result using ASR engine 130. ASR engine 130 is configured to process audio including speech using automatic speech recognition to determine a textual representation corresponding to at least a portion of the speech. ASR engine 130 may implement any type of automatic speech recognition to process speech, as the techniques described herein are not limited to the particular automatic speech recognition process(es) used. As one non-limiting example, ASR engine 130 may employ one or more acoustic models and/or language models to map speech data to a textual representation. These models may be speaker independent or one or both of the models may be associated with a particular speaker or class of speakers. Additionally, the language model(s) may include domain-independent models used by ASR engine 130 in determining a recognition result and/or models that are tailored to a specific domain. The language model(s) may optionally be used in connection with a natural language understanding (NLU) system configured to process a textual representation to gain some semantic understanding of the input, and output one or more NLU hypotheses based, at least in part, on the textual representation. ASR engine 130 may output any suitable number of recognition results, as aspects of the invention are not limited in this respect. In some embodiments, ASR engine 130 may be configured to output N-best results determined based on an analysis of the input speech using acoustic and/or language models, as described above.

The electronic device 102 shown in FIG. 1 includes ASR processing performed locally on the electronic device 110. In some embodiments, ASR processing may be performed in whole or in part by one or more computers (e.g., server 150) remotely located from electronic device 102. For example, in some embodiments, speech recognition may be performed locally using an embedded ASR engine associated with electronic device 102, a remote ASR in network communication with electronic device 102 via one or more networks, or speech recognition may be performed using a distributed ASR system including both embedded and remote components. Additionally, it should be appreciated that computing resources used in accordance with ASR engine 130 may also be located remotely from electronic device 102 to facilitate the ASR processing described herein, as aspects of the invention related to ASR processing are not limited in any way based on the particular implementation or arrangement of these components within a computing environment 100.

Figure 2:
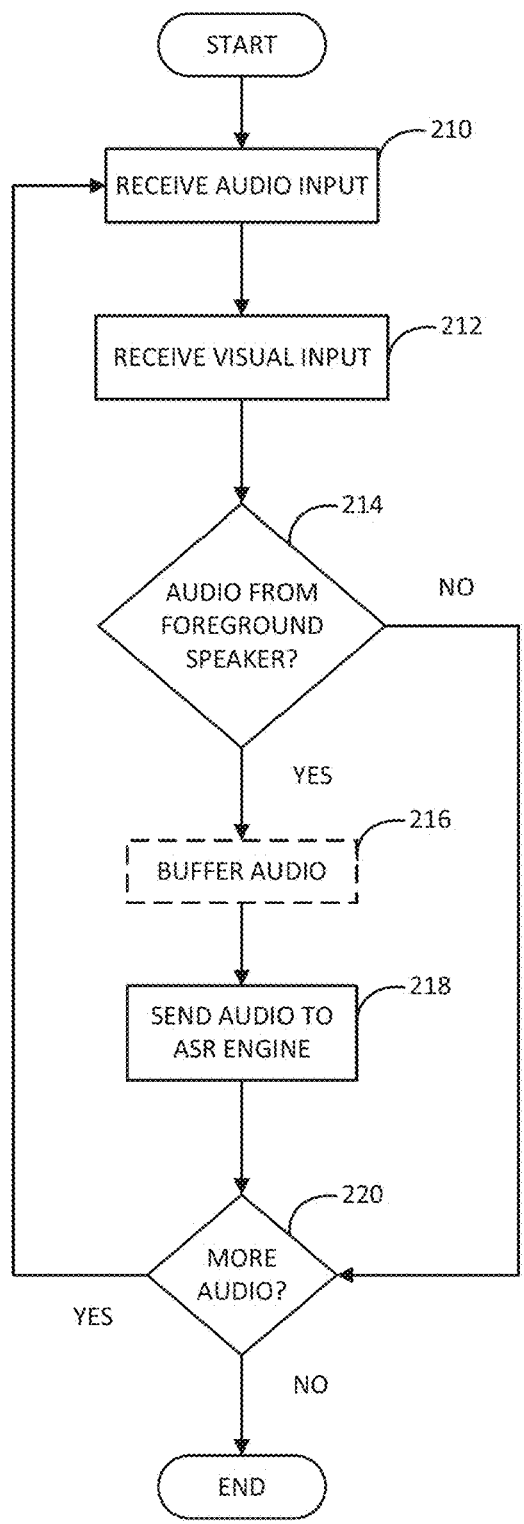
FIG. 2 is flowchart of process for using visual information to facilitate a speech recognition process in accordance with some embodiments.

FIG. 2 shows a flow diagram of a process for using visual information to facilitate a speech recognition process in accordance with some embodiments. In act 210 audio input comprising speech is received. For example, an electronic device may include a microphone that samples audio input at a particular sampling rate (e.g., 16 kHz), and receiving audio input in act 210 may comprise the process of sampling audio input by the microphone. The process then proceeds to act 212, where visual input is received. Visual input may be received in any suitable way. For example, the electronic device may include one or more cameras that capture image data. Additionally or alternatively, one or more imaging sources external to the electronic device may capture image data and the captured image data may be transferred to the electronic device for processing, as discussed above. Although the process of FIG. 2 illustrates acts 210 and 212 occurring in series, it should be appreciated that in some embodiments audio data and video data may be received, at least partially, in parallel.

The process then proceeds to act 214, where it is determined based, at least in part, on the received audio input and/or the received visual input, whether the received audio comprises speech from a foreground speaker. Techniques for determining whether the received audio comprises speech from a foreground speaker in accordance with some embodiments, are described in more detail below. As discussed in more detail below, the received audio input and/or visual input may be divided into short time segments called "frames," and one or more of the frames may be processed in act 214 to determine whether the audio in those one or more frames comprises speech from a foreground speaker.

If it is determined in act 214 that the audio comprises speech from a foreground speaker, the process proceeds to act 216, where at least a portion of the speech is optionally buffered prior to sending the audio to an ASR engine for speech recognition processing. For example, when it is determined that one or more frames of audio data comprise speech from the foreground speaker, the one or more frames of audio data may be stored in a buffer, whereas frames of audio data determined not to include speech from the foreground speaker may not be buffered or sent to the ASR engine, and optionally, these frames may be discarded.

The process then proceeds to act 218, where the audio, optionally stored in a buffer, is sent to the ASR engine for speech recognition processing. The ASR engine may use any suitable speech processing technique(s) to process the received audio and output a textual representation of the foreground speaker's speech, examples of which are known in the art, as described above. In some embodiments, only frames determined to include speech from a foreground speaker are sent to an ASR engine for speech recognition processing. By only sending portions of the audio input that include speech from a foreground speaker to the ASR engine for processing, the speech recognition process may be improved, especially when the audio input is collected in a noisy environment that includes background interference. In other embodiments, all frames of the audio input may be sent to an ASR engine for speech recognition processing. In such embodiments, the determination of whether a frame of audio includes speech from a foreground speaker may be used to label or "tag" speech recognition results returned from the ASR engine. For example, speech recognition results corresponding to frames of audio determined to include speech from a foreground speaker may be labeled as "foreground," whereas speech recognition results corresponding to frames of audio determined not to include speech from the foreground speaker may be labeled as "background." Separation of speech recognition results for the foreground speaker and one or more background speakers may then be made based, at least in part, on the labels associated with each of speech recognition results.

The process then proceeds to act 220, where it is determined whether there is more audio (e.g., additional frames of audio) to process. If it is determined in act 220 that there is more audio to process (e.g., if audio and images are being received continuously by the electronic device), the process returns to act 210, and the process of FIG. 2 is repeated until it is determined in act 220 that there is no more audio to process.

Figure 3:
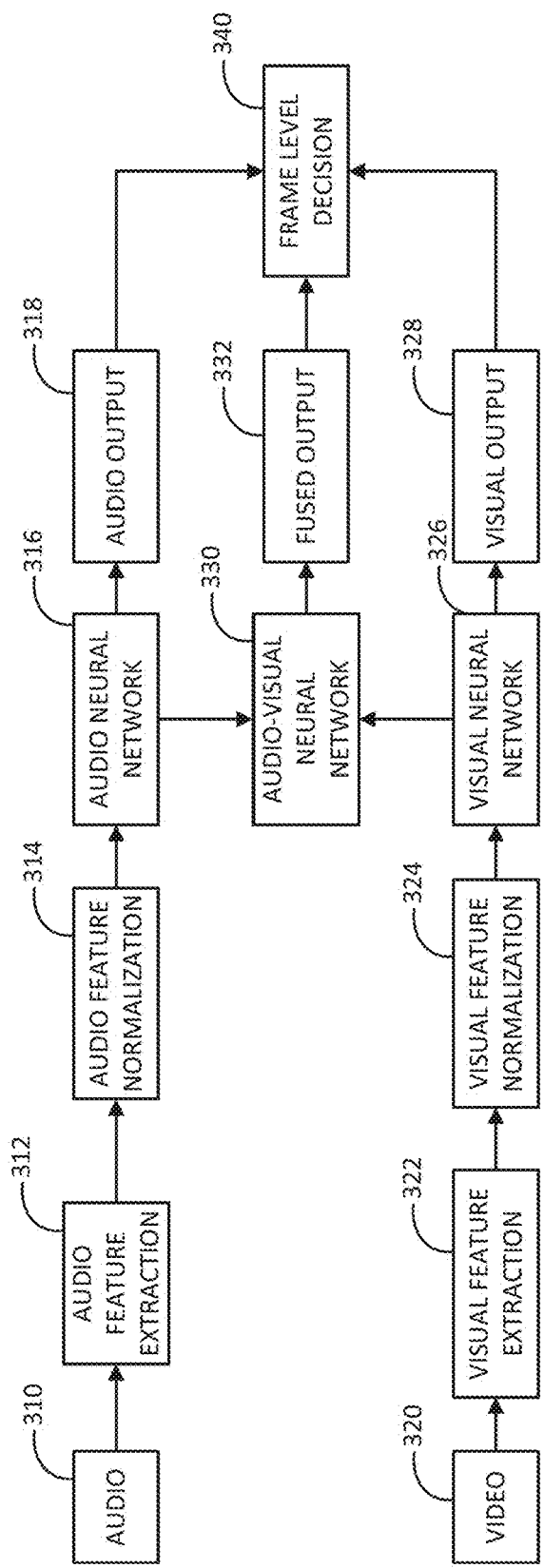
FIG. 3 is a flowchart of a process for using an audio-visual neural network to facilitate a speech recognition process in accordance with some embodiments.

In some embodiments, information determined from the received audio data and/or the received visual data is processed using one or more neural networks to determine whether the received audio comprises speech from a foreground speaker, as discussed above. FIG. 3 schematically illustrates a technique for using neural networks to process received audio and visual data to facilitate a speech recognition process in accordance with some embodiments. The process of FIG. 3 illustrates an audio processing pipeline and a visual processing pipeline operating in parallel. Processing in the two pipelines may operate at the same or different rates, and aspects of the invention are not limited in this respect. In some embodiments discussed in more detail below, processing in the audio processing pipeline occurs at a rate of 100 audio frames per second, whereas processing in the video processing pipeline occurs at a rate of 30 video frames per second. Processing in the audio processing pipeline and the video processing pipeline, in accordance with some embodiments, is discussed in further detail below.

In act 310, audio is received (e.g., by a microphone). The received audio may be converted into a digital representation by sampling the audio at a particular sampling rate (e.g., 16 kHz) and dividing the sampled audio into audio frames (e.g., 25 ms frames). Frames of the sampled audio may then be processed in act 312, to determine audio features for the frame, which characterize the spectral content of the speech in the frame. Any suitable audio features useful for automatic speech recognition may be determined for frames of the sampled audio data. For example, in some embodiments a plurality of Mel-frequency cepstral coefficients (MFCCs) are determined for each frame of audio input. Alternatively, Linear prediction coefficients (LPCs), linear prediction cepstral coefficients (LPCCs) or any other suitable audio features may be determined for each frame of audio processed in the audio processing pipeline.

The audio processing pipeline then proceeds to act 314, where the audio features for each frame are normalized. Any suitable normalization technique, examples of which are known in the art, may be used. For example, in some embodiments an energy measure is determined for each frame, and determined energy measure may be used for normalization. The process then proceeds to act 316, where one or more frames of features are provided as input to an audio neural network. In some embodiments, audio features for nine frames of input audio (e.g., with each frame having 24 MFCCs) are combined into one feature vector, which is provided as input to the audio neural network. The process then proceeds to act 318, where audio information is output from the audio neural network. In accordance with the techniques described herein, output from the audio neural network may also be provided to an audio-visual neural network. The audio-visual neural network may be configured to combine audio and visual features to generate an audio-visual fused output, as discussed in more detail below.

The video processing pipeline of FIG. 3 includes act 320, where video is received (e.g., by a camera) and sampled at a particular frame rate (e.g., 30 Hz) to produce a digital video signal. In act 322, at least some information in frames of the sampled video may then be processed to determine visual features characterizing the spatial spectral energy for at least a portion of the frame of video. In some embodiments, face detection and/or region of interest techniques are used to identify a portion of an image (e.g., all or a portion of a face in the image) from which visual features are to be determined. For example, a portion of the image in a frame corresponding to the lips of the speaker may be selected as a region of interest, and visual features for this region of interest may be determined.

Any suitable visual features useful for determining whether the received audio comprises speech from a foreground speaker may be determined. In some embodiments, the image for a frame of video data is analyzed and a 64×64 pixel region of interest including the mouth of a speaker in the image is identified. At least a portion of the data in the region of interest is processed to determine a vector of visual features characterizing the spatial spectral energy for at least a portion of the frame of video. The process then proceeds to act 324, where the determined visual features are normalized, for example, based on an energy measure in each frame of features, or using any other suitable normalization technique. The process then proceeds to act 326, where one or more frames of visual features are provided as input to a visual neural network. In some embodiments, visual features for fifteen frames of input video are combined into one feature vector, which is provided as input to the visual neural network. The process then proceeds to act 328, where visual information is output from the visual neural network. In accordance with the techniques described herein, output from the visual neural network may also be provided to an audio-visual neural network, which combines audio and visual features to generate an audio-visual fused output, as discussed in more detail below.

As shown in FIG. 3, information output from the audio neural network 316 and the visual neural network 326 may be used to form a fused feature space that is input (e.g., as input target posteriors) to audio-visual neural network 330. In act 332, information (e.g., output target posteriors) from the audio-visual neural network is output. As shown, the output target posteriors from the audio neural network, the visual neural network, and the audio-visual neural network may be decision fused in act 340 to produce a frame-level (or multi-frame level) decision of whether a segment of audio comprises speech from a foreground speaker. The outputs of each neural network may be weighted in any suitable way, examples of which are discussed in detail below. In accordance with some techniques described herein, the frame-level decision may be used, at least in part, to determine whether to perform ASR processing on the frame of audio.

Figure 4:
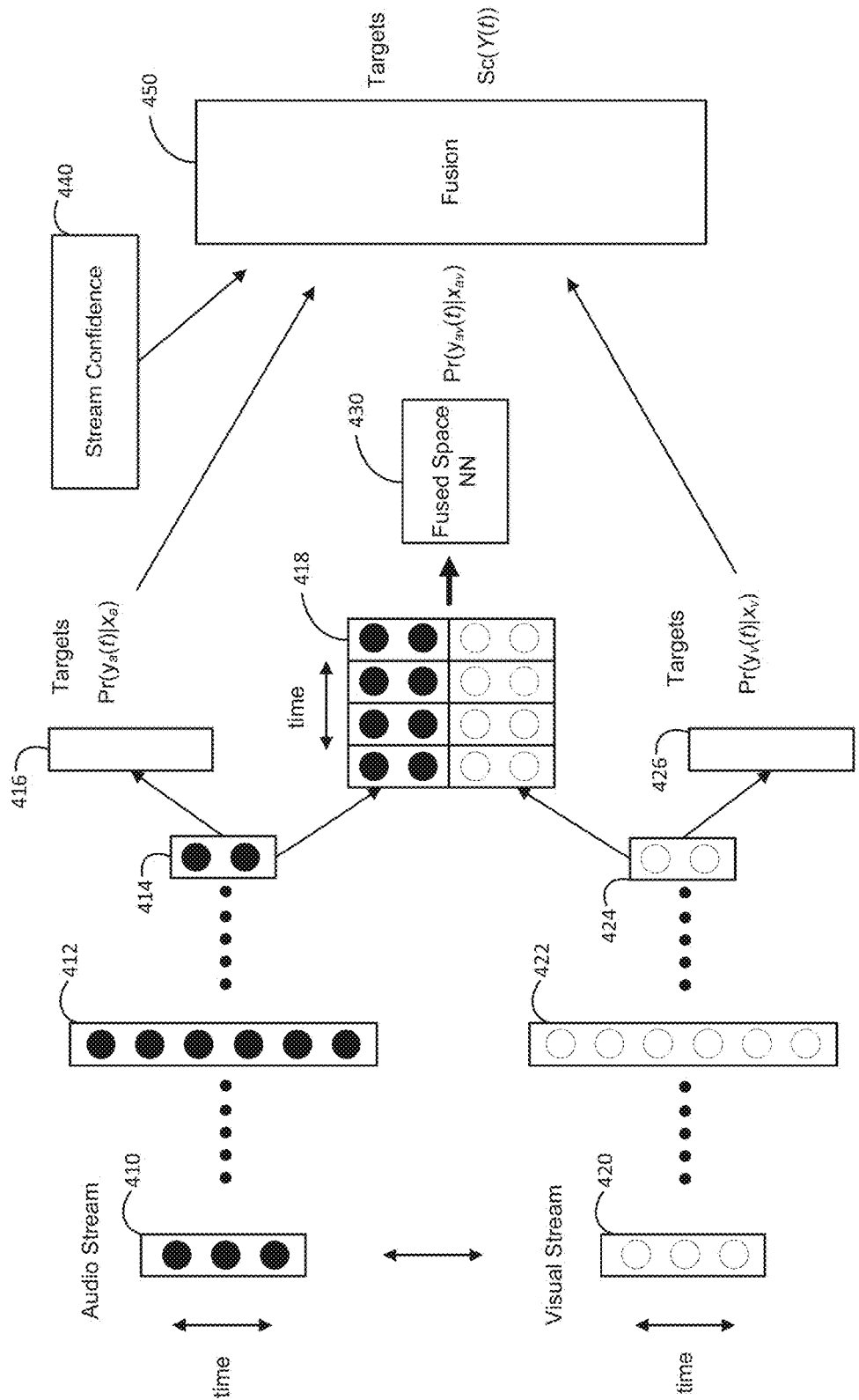
FIG. 4 is a schematic illustration of a process for using audio and visual features to facilitate a speech recognition process in accordance with some embodiments.

FIG. 4 shows a schematic illustration of a process for combining audio and visual information to facilitate speech recognition in accordance with some embodiments. In the illustrative process of FIG. 4, continuously received audio and video streams are processed in parallel in a manner similar to that described above in connection with the process of FIG. 3. As shown, frames of audio (e.g., 25 ms of audio) are continuously processed in act 410 at a particular frequency (e.g., 100 frames/second) to determine a plurality of audio features (represented as black circles) for each frame. The process then proceeds to act 412, where audio features from multiple frames are combined prior to being provided as input to an audio neural network. In act 414, the audio neural network determines a plurality of audio-output features based on the input. The audio-output features are used to generate target posteriors $Pr(y_a(t)|x_a)$ representative of whether, based only on analysis of the audio signal, an audio frame should be classified as comprising speech from the foreground speaker.

The audio neural network may be configured in any suitable way using any suitable number of layers and nodes. In one non-limiting implementation a three-layer neural network having 1000-2000 nodes per layer may be used as the audio neural network. Additionally, the audio neural network may be trained in any suitable way. For example, in some embodiments, errors determined during the process of generating the target posteriors for an audio frame are backpropogated through the neural network for training the network. In some embodiments described in more detail below, errors determined from an audio-visual neural network are not backpropagated to train the audio neural network.

As shown, frames of visual information are continuously processed in act 420 at a particular frequency (e.g., 30 frames/second) to determine a plurality of visual features (represented as open circles) for each frame. The process then proceeds to act 422, where visual features for multiple frames are combined prior to being provided as input to an visual neural network. In act 424, the visual neural network determines a plurality of visual-output features based on the input. The visual-output features are used to generate target posteriors $Pr(y_v(t)|x_v)$ representative of whether, based only on analysis of the visual input, an audio frame should be classified as comprising speech from the foreground speaker.

The visual neural network may be configured in any suitable way using any suitable number of layers and nodes. In one non-limiting implementation a three-layer neural network having 1000-2000 nodes per layer may be used as visual neural network. Additionally, the visual neural network may be trained in any suitable way. For example, in some embodiments, errors determined during the process of generating the target posteriors for a frame of visual information are backpropogated through the neural network for training the network. In some embodiments described in more detail below, errors determined from an audio-visual neural network are not backpropagated to train the visual neural network.

Because the audio and visual processing streams may be processed at different frequencies, audio-output features output from the audio neural network and visual-output features output from the visual neural network may be stacked in time in act 418 to synchronize the audio and visual processing streams. The synchronization may occur in any suitable way. For example, in some embodiments, the synchronization may be based on absolute time stamps associated with each audio frame and video frame. Following synchronization, the combined audio and visual features are then provided as input to an audio-visual neural network. In act 430, the audio-visual neural network generates target posteriors $Pr(y_{av}(t)|x_{av})$ representative of whether, based on an analysis of the combined audio and visual input, an audio frame should be classified as comprising speech from the foreground speaker.

The audio-visual neural network may be configured in any suitable way using any suitable number of layers and nodes. In one non-limiting implementation a three-layer neural network having 1000-2000 nodes per layer may be used as the audio-visual neural network. Additionally, the audio-visual neural network may be trained in any suitable way. For example, in some embodiments, errors determined during the process of generating the target posteriors are backpropagated through the neural network for training the network.

As shown, the target posteriors $Pr(y_a(t)|x_a)$ output from the audio neural network, the target posteriors $Pr(y_v(t)|x_v)$ output from the visual neural network and the target posteriors $Pr(y_{av}(t)|x_{av})$ output from audio-visual neural network are provided as inputs to a processing stage 450, where a multi-modal target score is determined based, at least in part, on the input target posteriors. A decision whether to transmit an audio frame to an ASR engine for speech processing may be made based, at least in part, on the multi-modal target score. In some embodiments the multi-modal target score is calculated as $$Sc(Y(t))=\lambda_{av} \log Pr(y_{av}(t)|x_{av})+\lambda_v \log Pr(y_v(t)|x_v)+\lambda_a \log Pr(y_a(t)|x_a),$$

where $\lambda_{av}$ is a weighting factor for the audio-visual neural network output, $\lambda_v$ is a weighting factor for the audio neural network output, and $\lambda_a$ is a weighting factor for the visual neural network output. In some embodiments, one or more multi-modal target scores may be smoothed in time to compute foreground speaker speech/non-speech segments used in gating frames of audio input to the ASR system.

Also provided as input to the processing stage 450 is stream confidence information 440. As discussed briefly above, in some embodiments, one or more of the target posteriors output from the neural networks are weighted based, at least in part, on one or more factors. For example, if corruption in the audio signal is detected, the signal-to-noise ratio (SNR) of the audio input may be poor, and the contribution of the audio and/or audio-visual neural network outputs may be de-emphasized in processing stage 450 by weighting these contributions appropriately. As another example, if a mouth of the foreground speaker is not detected in a frame image, the contribution of the visual and/or audio-visual neural network output may be de-emphasized due to the possible unreliability of the received visual information in predicting whether an audio frame comprises speech from the foreground speaker.

In embodiments that employ weighting, the weights may be determined in any suitable way. Some embodiments are configured to estimate the SNR of the audio signal continuously or periodically and to adjust the one or more of the weights used in processing stage 450. For example, the SNR of the audio signal may be compared to a threshold value, and if the SNR is found to be below the threshold value, the contribution of the audio and/or audio-visual neural networks may be reduced relative to the visual neural network contribution by adjusting the weights accordingly.

Figure 5:
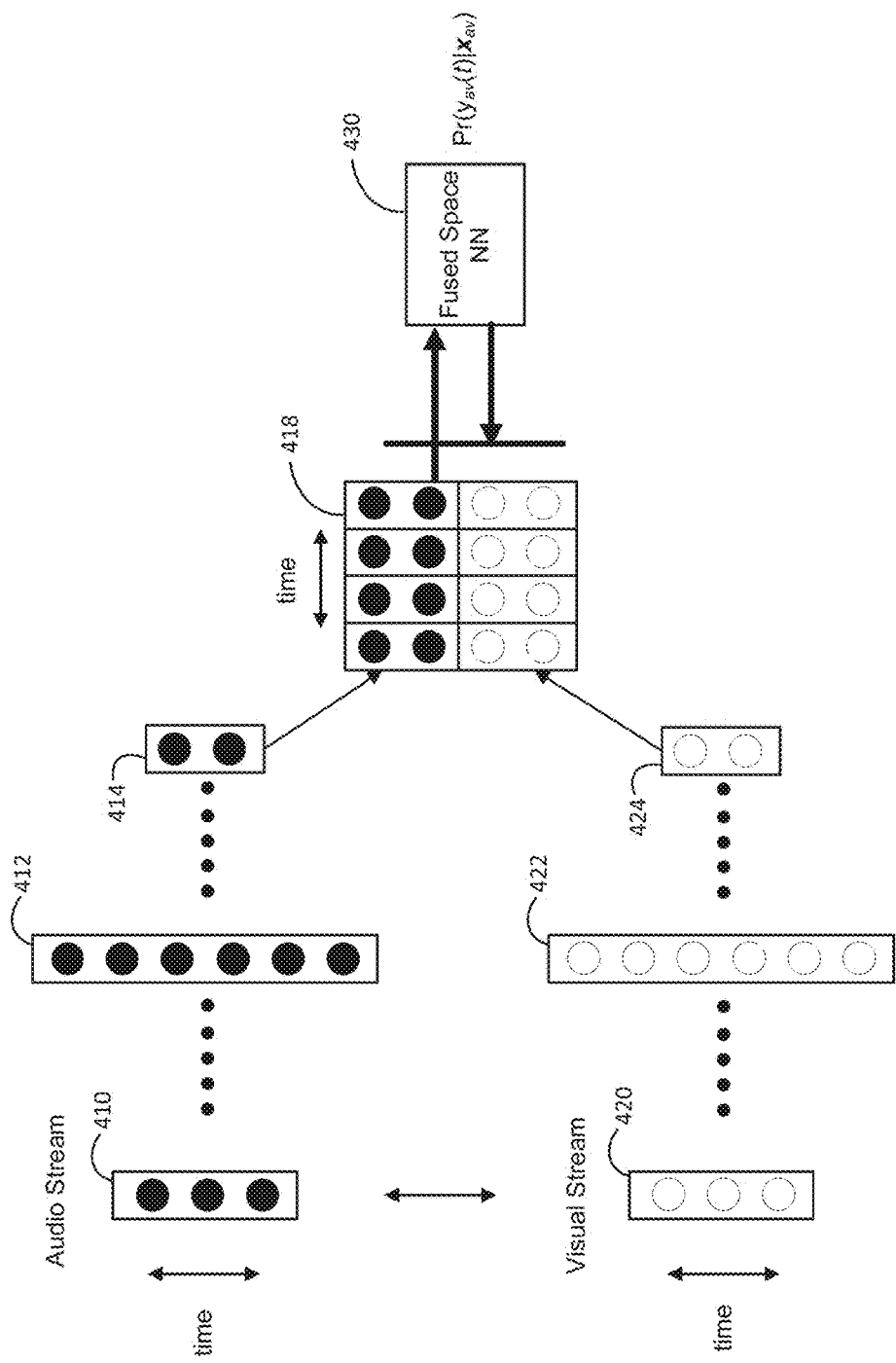
FIG. 5 is a schematic illustration of a portion of the process of FIG. 4 in which backpropagation is not used to train at least one neural network, in accordance with some embodiments.

As discussed above, one or more of the neural networks used in accordance with some embodiments may be trained using backpropagation of errors from the audio-visual neural network to the unimodal (i.e., audio and video) neural networks. However, the inventors have recognized that large differences in performance of the unimodal neural networks (e.g., when the performance of the visual neural network is much less than the performance of the audio neural network) often results in performance of the system that approaches a unimodal audio neural network (i.e., the contribution of the visual information is substantially diminished). To at least partially account for this behavior, in some embodiments, the unimodal neural networks are not updated based on results of processing in the audio-visual neural network, as shown in FIG. 5

Figure 6:
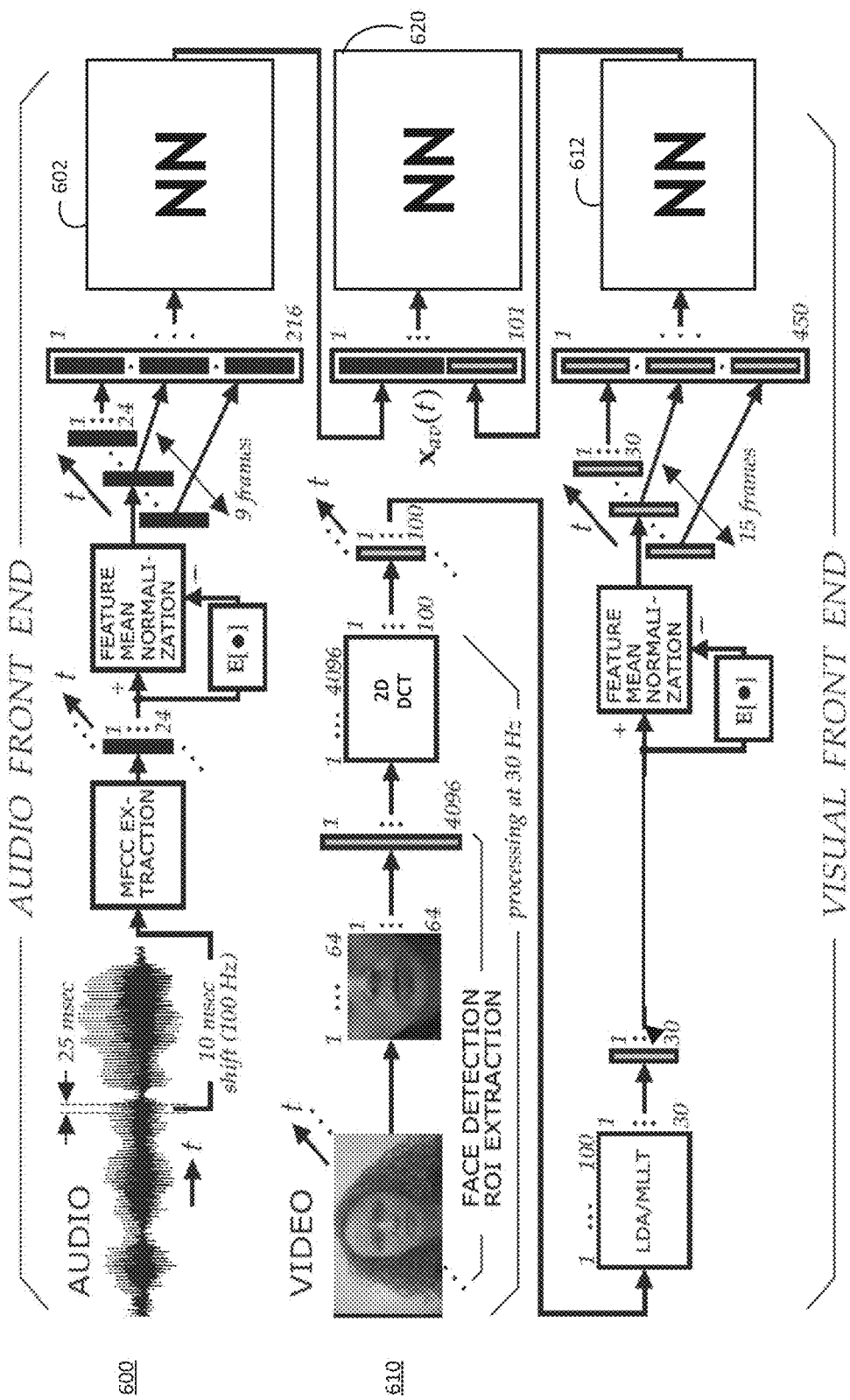
FIG. 6 is a schematic illustration of an alternative process for using audio and visual features to facilitate a speech recognition process in accordance with some embodiments.

FIG. 6 illustrates a process for using audio and visual features to facilitate a speech recognition process in accordance with some embodiments. As discussed previously in connection with FIGS. 3 and 4, the process of FIG. 6 includes an audio processing pipeline 600 and a visual processing pipeline 610. For the audio processing pipeline 600, audio is continuously received and divided into audio frames. Audio features (e.g., 24 MFCC features) are determined for each frame, and the features are normalized. A plurality (e.g., nine) of the normalized audio feature sets are combined and provided as input to an audio neural network 602, as discussed previously.

For the visual processing pipeline 610, frames of video are continuously received, and the image for each frame of video is processed to determine visual features in the image. For example, the image may be processed using one or more face detection and/or region of interest techniques to identify a relevant portion of the image from which to determine the visual features. As shown, in some embodiments a 64×64 pixel region of interest is identified for each image, and the visual features determined for the image comprise the pixel values at each of the 4096 pixel locations in the region of interest. Different region of interest techniques may be used based on the source of the received video. For example, if the source of the video is from a near-field imaging device (e.g., a camera integrated with a smartphone or some other portable electronic device), a region of interest in the image including the mouth and/or lips of the foreground speaker may be identified. Alternatively, if the source of the video is from a far-field imaging device (e.g., a camera located at a distance from the foreground speaker), a region of interest corresponding to the lower half of the face of the foreground speaker may be identified. Other region of interest techniques may additionally or alternatively be used, and aspects of the invention are not limited in this respect.

The spectral energy of the region of interest is then determined by, for example, applying a two-dimensional discrete cosine transform (2-D DCT), the output of which is a visual feature vector with reduced dimensions (e.g., 100 elements). The dimensionality of the visual feature vector may be further reduced using known techniques including, but not limited to, linear discriminant analysis (LDA) and maximum likelihood linear transform (MLLT). The visual feature vector may be normalized and multiple frames (e.g., 15 frames) of feature vectors may be combined and provided as input to a visual neural network 612, as discussed previously. Output from the audio neural network 602 and output from the visual neural network may be provided as input to audio-visual neural network 620, as discussed previously. A decision on whether a segment of audio comprises speech from a foreground speaker may be made based, at least in part, on a score determined using the outputs of one or more of audio neural network 602, visual neural network 612, and audio-visual neural network 620, as discussed above.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a USB drive, a flash memory, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An electronic device, comprising:
    an audio input interface configured to receive audio information comprising speech from a foreground speaker and background audio information;
    a visual input interface configured to receive visual information including an image of at least a portion of the foreground speaker or an environment of the foreground speaker; and
    at least one processor programmed to:
        divide the received audio information into a plurality of audio frames;
        determine for each of the plurality of audio frames whether the audio information in the audio frame includes speech from the foreground speaker or whether the audio frame does not include speech from the foreground speaker, wherein the determining is based, at least in part, on the received visual information; and
        transmit the audio frame to an automatic speech recognition (ASR) engine for speech recognition only when it is determined that the audio frame includes speech from the foreground speaker.

2. The electronic device of claim 1, further comprising an imaging device configured to capture the image, wherein the visual input interface is configured to receive the visual information from the imaging device.

3. The electronic device of claim 2, wherein the at least one processor is further programmed to determine visual features from the image captured by the imaging device, and wherein determining whether the audio information in the frame comprises speech from the foreground speaker is based, at least in part, on the determined visual features.

4. The electronic device of claim 3, wherein determining visual features from the image comprises:
    identifying a region of interest in the image, wherein the region of interest corresponds to at least a portion of a face of the foreground speaker; and
    determining the visual features from the identified region of interest.

5. The electronic device of claim 1, wherein the at least one processor is programmed to identify information for one or more background speakers based on the image, and wherein determining whether the audio information in the audio frame comprises speech from the foreground speaker is based, at least in part, on the information for one or more background speakers.

6. The electronic device of claim 1, wherein the at least one processor is further programmed to implement at least one neural network, and wherein determining whether the audio information in the audio frame comprises speech from the foreground speaker is based, at least in part, on output from the at least one neural network.

7. The electronic device of claim 6, wherein the at least one neural network comprises an audio-visual neural network configured to receive as input, audio feature information based, at least in part, on the received audio information, and visual feature information based, at least in part, on the received visual information, and wherein determining whether the audio information in the audio frame comprises speech from the foreground speaker is based, at least in part, on output from the audio-visual neural network.

8. The electronic device of claim 7, wherein the at least one neural network further comprises an audio neural network configured to receive as input, audio features for a plurality of audio frames, and a visual neural network configured to receive as input, visual features for a plurality of visual data frames, and wherein determining whether the audio information in the audio frame comprises speech from the foreground speaker is based, at least in part, on output from the audio neural network, output from the visual neural network, and the output from the audio-visual neural network.

9. The electronic device of claim 8, wherein determining whether the audio information in the audio frame comprises speech from the foreground speaker comprises weighting the output of the audio neural network using a first weighting factor, weighting the output of the visual neural network using a second weighting factor, and weighting the output of the audio-visual neural network using a third weighting factor, and wherein determining whether the audio information in the audio frame comprises speech from the foreground speaker is based, at least in part, on the weighted output of the audio, visual, and audio-visual neural networks.

10. The electronic device of claim 8, wherein the output of the audio neural network and the output of the visual neural network are provided as input to the audio-visual neural network as the audio feature information and the visual feature information, respectively.

11. The electronic device of claim 1, wherein the visual input interface is configured to receive the visual information from a far-field imaging device separate from the electronic device.

12. The electronic device of claim 1, wherein the at least one processor is further programmed to:
  transmit the audio frame to the automatic speech recognition (ASR) engine for speech recognition when it is determined that the audio frame does not comprise speech from the foreground speaker;
  receive speech recognition results from the ASR engine; and
  label at least a portion of the speech recognition results as being from the foreground speaker based, at least in part, on whether one or more audio frames from which the at least a portion of the speech recognition results was produced was determined to comprise speech from the foreground speaker.

13. A method of using visual information to facilitate a speech recognition process, the method comprising:

receiving audio information comprising speech from a foreground speaker and background audio information;
  receiving the visual information including an image of at least a portion of the foreground speaker or an environment of the foreground speaker;
  dividing the received audio information into a plurality of audio frames;
  determining for each of the plurality of audio frames whether the audio information in the audio frame includes speech from the foreground speaker or whether the audio frame does not includes speech from the foreground speaker, wherein the determining is based, at least in part, on the received visual information; and
  transmitting the audio frame to an automatic speech recognition (ASR) engine for speech recognition only when it is determined that the audio frame includes speech from the foreground speaker.

14. The method of claim 13, wherein the method further comprises:
  identifying a region of interest in the image, wherein the region of interest corresponds to at least a portion of a face of the foreground speaker; and
  determining visual features from the identified region of interest, wherein determining whether the audio information in the audio frame comprises speech from the foreground speaker is based, at least in part, on the determined visual features.

15. The method of claim 13, further comprising:
  implementing, using at least one processor, at least one neural network, and wherein determining whether the audio information in the audio frame comprises speech from the foreground speaker is based, at least in part, on output from the at least one neural network.

16. The method of claim 15, wherein the at least one neural network comprises:
  an audio-visual neural network configured to receive as input, audio feature information based, at least in part, on the received audio information, and visual feature information based, at least in part, on the received visual information, and wherein determining whether the audio information in the audio frame comprises speech from the foreground speaker is based, at least in part, on output from the audio-visual neural network;
  an audio neural network configured to receive as input, audio features for a plurality of audio frames; and
  a visual neural network configured to receive as input, visual features for a plurality of visual data frames, and wherein determining whether the audio information in the audio frame comprises speech from the foreground speaker is based, at least in part, on output from the audio neural network, output from the visual neural network, and the output from audio-visual neural network.

17. A non-transitory computer-readable medium encoded with a plurality of instructions that, when executed by at least one processor perform a method, the method comprising:
  dividing received audio information into a plurality of audio frames, wherein the audio information comprises speech from a foreground speaker and background audio information;
  determining for each of the plurality of audio frames whether the audio information in the audio frame includes speech from the foreground speaker or whether the audio frame does not include speech from the foreground speaker, wherein the determining is based, at least in part, on received visual information that includes an image of at least a portion of the foreground speaker or an environment of the foreground speaker; and transmitting the audio frame to an automatic speech recognition (ASR) engine for speech recognition only when it is determined that the audio frame includes speech from the foreground speaker.

18. The non-transitory computer-readable medium of claim 17, wherein the method further comprises:

identifying a region of interest in the image, wherein the region of interest corresponds to at least a portion of a face of the foreground speaker; and determining visual features from the identified region of interest, wherein determining whether the audio information in the audio frame comprises speech based, at least in part, on the determined visual features.

19. The non-transitory computer-readable medium of claim 17, wherein the method further comprises:

implementing an audio neural network configured to receive as input, audio features for a plurality of audio frames, a visual neural network configured to receive as input, visual features for a plurality of visual data frames, and an audio-visual neural network configured to receive as input, output from the audio neural network and output from the visual neural network, and wherein determining whether the audio information in the audio frame comprises speech from the foreground speaker is based, at least in part, on output from the audio neural network, output from the visual neural network, and output from the audio-visual neural network.

* * * * *